(12) United States Patent
Roesgen et al.

(10) Patent No.: US 8,672,009 B2
(45) Date of Patent: Mar. 18, 2014

(54) PNEUMATIC TIRE WITH DUAL LAYER SIDEWALL

(75) Inventors: Alain Emile Francois Roesgen, Asselbom (LU); Marc Hedo, Colmar-Berg (LU); Giorgio Agostini, Colmar-Berg (LU); Filomeno Gennaro Corvasce, Mertzig (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 1527 days.

(21) Appl. No.: 12/235,821

(22) Filed: Sep. 23, 2008

(65) Prior Publication Data

US 2010/0071825 A1   Mar. 25, 2010

(51) Int. Cl.
*B60C 1/00* (2006.01)

(52) U.S. Cl.
USPC .......................................... 152/525; 152/517

(58) Field of Classification Search
USPC ................................................. 152/525, 517
See application file for complete search history.

(56) References Cited

U.S. PATENT DOCUMENTS

| | | | |
|---|---|---|---|
| 3,830,274 A | 8/1974 | Waser | 152/355 |
| 3,937,862 A | 2/1976 | Dillenschneider | 428/409 |
| 3,994,329 A * | 11/1976 | Masson et al. | 152/517 |
| 4,163,467 A * | 8/1979 | Dobson | 152/508 |
| 4,287,924 A * | 9/1981 | Deck et al. | 152/153 |
| 5,088,537 A | 2/1992 | Kan et al. | 152/525 |
| 5,238,991 A * | 8/1993 | Magnus et al. | 524/520 |
| 5,494,091 A | 2/1996 | Freeman et al. | 152/517 |
| 5,494,958 A | 2/1996 | Freeman et al. | 524/505 |
| 5,714,022 A | 2/1998 | Nagao et al. | 152/525 |
| 5,795,416 A | 8/1998 | Willard, Jr. et al. | 152/517 |
| 5,992,487 A * | 11/1999 | Adachi | 152/524 |
| 7,082,976 B2 | 8/2006 | Ishida | 152/209.5 |
| 2005/0230021 A1 | 10/2005 | Cottrell et al. | 152/517 |
| 2007/0044887 A1 | 3/2007 | Jin et al. | 152/554 |
| 2007/0044888 A1 | 3/2007 | Jin et al. | 152/555 |
| 2007/0137752 A1 | 6/2007 | Agostini et al. | 152/450 |

FOREIGN PATENT DOCUMENTS

JP    54006206    *  6/1977

* cited by examiner

*Primary Examiner* — Joseph S Del Sole
*Assistant Examiner* — David N Brown, II
(74) *Attorney, Agent, or Firm* — Robert N. Lipcsik

(57) ABSTRACT

A pneumatic radial ply tire includes a pair of beads, a single carcass ply, a tread, and a pair of sidewalls. The pair of beads each has an associated chaffer. The single carcass ply is folded about each bead so as to define a main body portion and a turnup portion associated with each bead. The tread is disposed radially outward from the single carcass ply. The tread has shoulder portions disposed at axial outer edges of the tread. The pair of sidewalls extends radially outward from each chaffer to a location adjacent each shoulder portion. Each sidewall is disposed axially outward of the single carcass ply. Each sidewall includes a first outer layer extending from the chaffer to the shoulder portion and a second inner layer extending from the chaffer to the shoulder portion. The second inner layer is disposed entirely between the single carcass ply and first outer layer. The second inner layer comprises a foamed structure of a rubber composition having a density ranging from 0.1 to 1.0 g/cm³.

4 Claims, 2 Drawing Sheets

PNEUMATIC TIRE WITH DUAL LAYER SIDEWALL

FIELD OF THE INVENTION

The present invention relates to a pneumatic tire, and more particularly, to a pneumatic tire having a light weight low cost sidewall.

BACKGROUND OF THE INVENTION

A pneumatic tire typically includes a pair of axially separated inextensible beads having at least one carcass ply extending between the two beads. The carcass ply includes axially opposite end portions each of which is turned up around a respective bead and secured thereto. Tread rubber and sidewall rubber are located axially from and radially outward of, respectively, the carcass ply.

The sidewall and bead area are portions that receive considerable attention during the tire design process. Under conditions of severe operation, the stresses in the bead area can be especially problematic, leading to separation of adjacent components. In particular, the ply turnup ends are prone to separation from adjacent structural elements of the tire. For this reason, a variety of structural design approaches have been used to manage separation of the tire elements in the bead area and the adjacent sidewall area. These design approaches typically include adding various polymeric materials within the bead area to increase strength and rigidity. In many tire bead designs, one or more fillers or apexes will be disposed between adjacent components. For instance, an apex might be positioned immediately radially outward of the bead and between the carcass main portion and the turnup portion. A second apex might be positioned between the turnup portion and the tire side wall. Many bead designs include additional elements, such as chaffers, flippers, chippers, toe guards, and clamping members, all designed to improve the durability of the bead area.

Bead area designs including the above-mentioned strengthening elements have some drawbacks, such as increased material costs as well as increased tire weight. To address these drawbacks, tire manufacturers continue to strive for reduced weight and volume characteristics, yet provide high sidewall and bead area durability. For certain tire markets, such as the radial light truck (RLT) tire market, manufacturers have made some progress in providing bead area designs with reduced weight and high durability.

For pneumatic tires used under relatively heavier loads, such as those for the radial medium truck (RMT) tire market, the volume of the various strengthening elements are typically increased to support the increased loads, thereby further increasing the material costs and weight of the tire. Consequently, as with the RLT tire market, manufacturers desire tires having reduced volume and weight characteristics that further provide high sidewall and bead area durability. Thus, there continues to be a need for tires with reduced weight and also high durability.

SUMMARY OF THE INVENTION

A pneumatic radial ply tire in accordance with the present invention includes a pair of beads, a single carcass ply, a tread, and a pair of sidewalls. The pair of beads each has an associated chaffer. The single carcass ply is folded about each bead so as to define a main body portion and a turnup portion associated with each bead. The tread is disposed radially outward from the single carcass ply. The tread has shoulder portions disposed at axial outer edges of the tread. The pair of sidewalls extends radially outward from each chaffer to a location adjacent each shoulder portion. Each sidewall is disposed axially outward of the single carcass ply. Each sidewall includes a first outer layer extending from the chaffer to the shoulder portion and a second inner layer extending from the chaffer to the shoulder portion. The second inner layer is disposed entirely between the single carcass ply and first outer layer. The second inner layer comprises a foamed structure of a rubber composition having a density ranging from 0.1 to 1.0 g/cm$^3$.

According to one aspect of the present invention, the foamed structure comprises an unvulcanized layer containing a heat activatable blowing agent shaped, molded, and heated under pressure to simultaneously co-vulcanize with the tire.

According to another aspect of the present invention, the pressure is applied by a shaping bladder positioned within a green tire to press and shape it outwardly against a mold to form the co-vulcanized tire.

According to still another aspect of the present invention, the foamed structure is formed by heat activating a blowing agent during the vulcanization process to simultaneously expand the foamed structure.

According to yet another aspect of the present invention, the heat activating occurs in the range from about 90° C. to about 200° C.

According to still another aspect of the present invention, the foamed structure is formed substantially simultaneously with the co-vulcanization step in order to enhance the integral tire construction and be integral with the tire construction.

According to yet another aspect of the present invention, the foamed structure includes elastomers and additives.

According to still another aspect of the present invention, the additives comprise carbon black, silica, zinc oxide, curatives, and oils.

According to yet another aspect of the present invention, the foamed structure has a density ranging from about 0.2 to about 0.9 g/cm$^3$.

According to still another aspect of the present invention, the foamed structure has a density ranging from about 0.2 to about 0.8 g/cm$^3$.

According to yet another aspect of the present invention, the foamed structure has a porosity ranging from about 20 to about 80 percent by volume.

According to still another aspect of the present invention, the foamed structure has a porosity ranging from about 30 to about 70 percent by volume.

According to yet another aspect of the present invention, the foamed structure is formed with a blowing agent.

According to still another aspect of the present invention, the blowing agent gives off gases triggered by the vulcanization temperatures.

According to yet another aspect of the present invention, the blowing agent comprises nitro, sulfonyl, and azo compounds.

According to still another aspect of the present invention, the nitro, sulfonyl, and azo compounds comprise dinitrosopentamethylene tetramine, N,N'-dimethyl-N,N'-dinitrosophthalamide, and azodicarbonamide.

According to yet another aspect of the present invention, the blowing agent comprises sulfonyl hydrazides.

According to still another aspect of the present invention, the sulfonyl hydrazides comprise benzenesulfonyl hydrazide, toluenesulfonyl hydrazide, and p,p'-oxy-bis-(benzenenesulfonyl)hydrazide.

According to yet another aspect of the present invention, the blowing agent comprises sulfonyl semicarbazides.

According to still another aspect of the present invention, the sulfonyl semicarbazides comprise p-toluene sulfonyl semicarbazide and p,p'-oxy-bis-(benzenesulfonyl semicarbazide).

BRIEF DESCRIPTION OF THE DRAWINGS

The accompanying drawing, which is incorporated in and constitutes a part of this specification, illustrates an embodiment of the invention and, together with a general description of the invention given above, and the detailed description given below, serves to explain the invention.

DEFINITIONS

Figure 1:
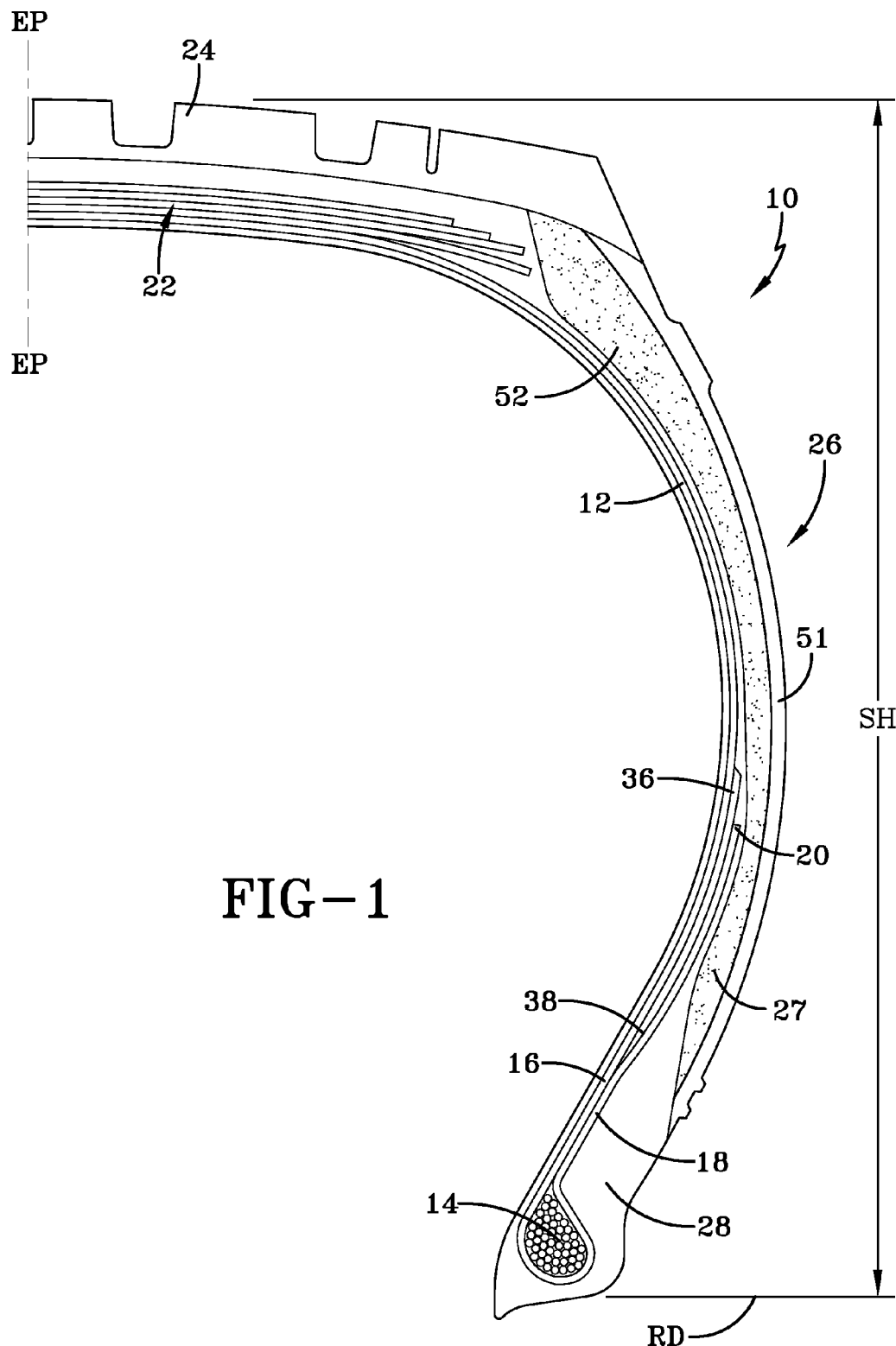
FIG. 1 is a partial cross-sectional view of an example pneumatic tire for use with the present invention.

"Apex" means an elastomeric filler located radially outward of the bead and between the plies and the turnup ply.

"Axial" and "axially" mean the lines or directions that are parallel to the axis of rotation of the tire.

"Bead" means that part of the tire comprising an annular tensile member wrapped by ply cords and shaped to fit the design rim, with or without other reinforcement elements such as flippers, chippers, apexes, toe guards and chaffers.

"Bead area" means that portion of the tire surrounding the bead.

"Carcass" means the tire structure apart from the belt structure, tread, undertread, and sidewall rubber over the plies, but including the beads.

"Chafer" means a strip of material placed around the outside of the bead to protect cord plies from the rim, distribute flexing about the rim, and to seal the tire.

"Cord" means one of the reinforcement strands of which the plies in the tire are comprised.

"Crown" refers to substantially the outer circumference of a tire where the tread is disposed.

"Equatorial plane (EP)" means the plane perpendicular to the tire's axis of rotation and passing through the center of its tread.

"Inner" and "inward" means toward the tire's interior.

"Insert height" means the radial distance between the nominal rim diameter and the inner edge of the rubber strip or insert.

"Outer" and "outward" means toward the tire's exterior.

"Ply" means a continuous layer of rubber-coated parallel cords.

"Pneumatic tire" means a laminated mechanical device of generally toroidal shape, usually an open-torus having beads and a tread and made of rubber, chemicals, fabric and steel or other materials.

"Radial" and "radially" mean directions radially toward or away from the axis of rotation of the tire.

"Radial cross section" means a cross section taken in the plane which contains the axis of rotation of a tire or tire and rim assembly.

"Radial tire" means a belted or circumferentially-restricted pneumatic tire in which the ply cords which extend from bead to bead are laid at cord angles between 65° and 90° with respect to the equatorial plane of the tire.

"Sectional width line" means a line parallel in the cross-section of the tire to its axis of rotation and which is located at the tire's point of maximum axial width.

"Side wall" means that portion of a tire between the tread and the bead area.

"Substantially hexagonal" means a six sided radial cross section, even though some or all of the sides may be curvilinear rather than rectilinear, as in a regular hexagon.

"Substantially pentagonal" means a five sided radial cross section, even though some or all of the sides may be curvilinear rather than rectilinear, as in a regular pentagon.

"Total section height" means the radial distance between the nominal rim diameter to the maximum outer diameter of the tire.

"Tread" means a molded rubber component which, when bonded to a tire casing, includes that portion of the tire that comes into contact with the road when the tire is normally inflated and under normal load.

"Turnup height" means the radial distance between the nominal rim diameter and the outer edge of the turnup portion or ply.

"Turnup ply" and "turnup portion" refers to a portion of a carcass ply that wraps around one bead only.

DETAILED DESCRIPTION OF AN EXAMPLE EMBODIMENT

Figure 2:
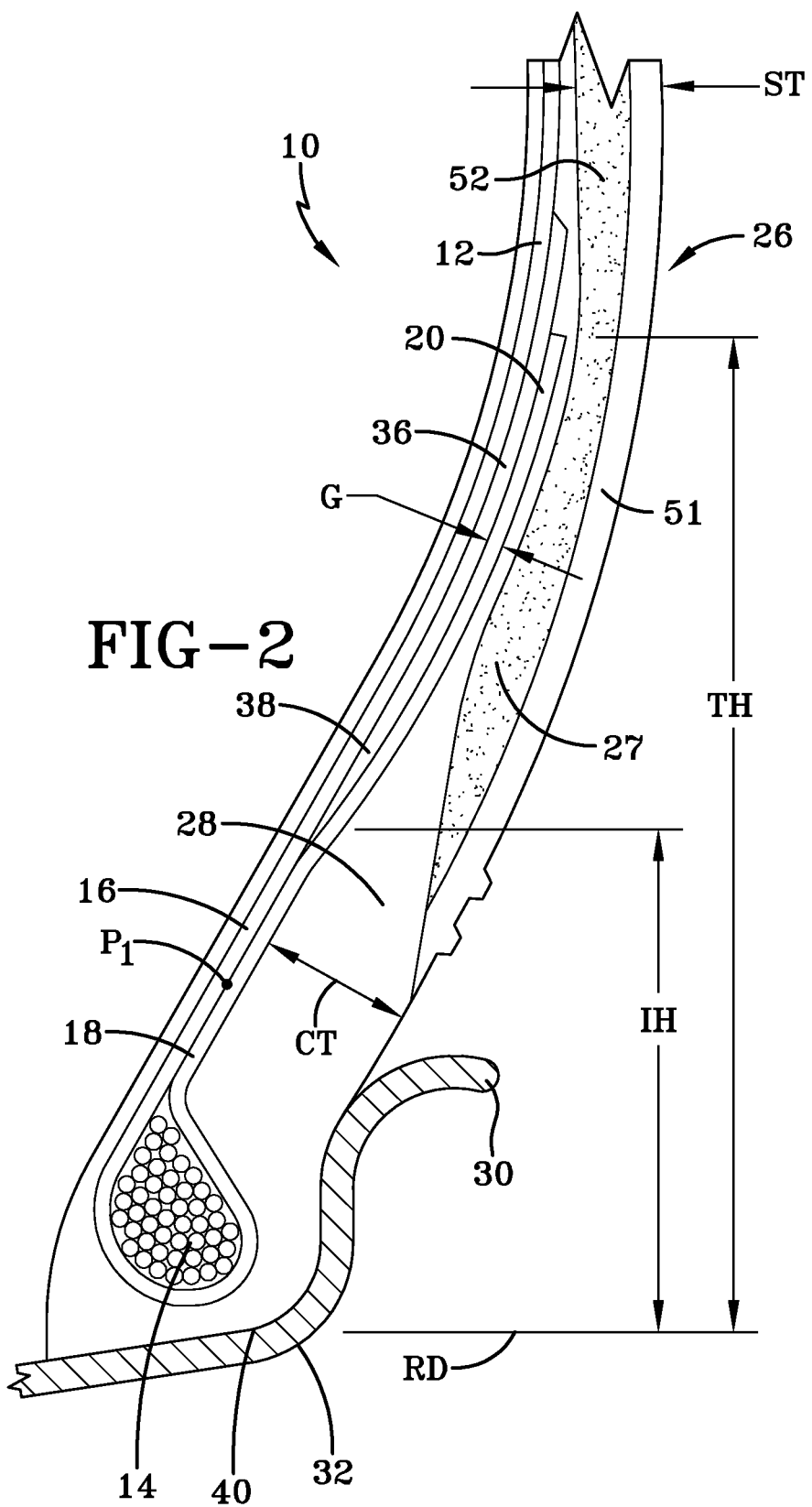
FIG. 2 is a detailed cross-sectional view of the sidewall area of the pneumatic tire of FIG. 1.

With reference to FIGS. 1 and 2, an example pneumatic tire 10 for use with the present invention includes at least one carcass ply 12 extending and wrapping around a pair of beads 14. For simplicity, only half of the example tire 10 is depicted in the drawings, while the other half may or may not be a substantial minor image of the half depicted across equatorial plane EP. The carcass ply 12 includes a main body portion 16 and a turn up portion 18 having a radial outer turnup end 20. The tire 10 also includes a plurality of belt plies 22 located radially outward of the carcass ply 12 in a crown portion of the tire 10. An elastomeric tread portion 24 is disposed radially outward of the belt plies 22. A sidewall portion 26 extends radially inward from the tread portion 24 toward the bead 14. The bead area may further include a chaffer 28 located axially outward of carcass ply 12 and bead 14 and extending from a radially inner end located radially inward of the radially outermost extent of the bead 14, to a radially outer end which is disposed radially outward of a flange 30 of a wheel rim 32. As shown in the drawings, the wheel rim 32 may be a flat base or 5° tapered rim. The example tire 10 of the present invention may also be utilized on other rims, such as a prop Center Tubeless having a 15° tapered rim.

The turnup portion 18 may be disposed against the main body portion 16 of the carcass ply 12 immediately above the bead 14 and may extend radially outward against the main body portion. The positioning of turnup portion 18 against the main body portion 16 may decrease bending strains in the cords (not shown) of carcass ply 12 and may limit force variations between the main body portion and turnup portion. The turnup portion 18 may mate with the main body portion 16 immediately after the bead 14.

The bead 14 of the example tire 10 has a radial cross-sectional shape which is substantially pentagonal, wherein the radially outermost extent of the bead 14 is a vertex of two of the sides of the pentagon to facilitate mating of the turnup portion 18 to main body portion 16 of the carcass ply 12. The pentagonal shape allows no apex to be used between the main body portion 16 and turnup portion 18 immediately adjacent the bead 14, as in other example bead area designs for use with the present invention. While the pentagonal shape of bead 14 may be advantageous, other bead 14 configurations may also be used with the present invention.

Referring to FIG. 2, the carcass ply 12 may be turned up or wrapped against the bead 14 and locked against the main body portion 16 of carcass ply 12 by the sidewall portion 26.

Using a nominal rim diameter RD as a reference, the turnup end 20 of the turnup portion 18 may have a turnup height TH between approximately 35-45% of a total section height SH of the example tire 10, as an example.

The bead area design may also include a thin rubber strip 36 interposed between the turnup portion 18 and main body portion 16 of the carcass ply 12 radially outward of bead 14. The rubber strip 36 may further reduce stresses in the region adjacent the turnup end 20. The rubber strip 36 may have an inner end 38 radially inward of the turnup end 20 and be generally coextensive with the turnup portion 28. The rubber strip 36 may be positioned between the main body portion 16 and turnup portion 18 so that an inner end 38 may have an insert height IH approximately 25% of the total section height SH. As another example for use with the present invention, the rubber strip 36 may extend all the way to the bead 14 so that there is essentially no region where the main body portion 16 and turnup portion 18 are in direct contact.

The example tire 10 may also include a chaffer 28 with an increased thickness to provide strength and durability to the bead area. The chaffer 28 may have a thickness CT to match a thickness ST of the sidewall portion 26, which mates with the radially outer end of the chaffer 28. A portion 40 of the bead area in contact with the wheel rim 32 may be configured such that, when the example tire 10 is mounted to the wheel rim and fully inflated to a normal pressure, the shape of the bead area portion may be substantially the same as the shape of the wheel rim 32. This may further reduces stress in the bead area prior to actual use of the example tire 10.

This same approach may also be also taken with the shape of a lower portion of the sidewall portion 26 and a radially outer portion of the chaffer 28. To this end, the shape, or curvature, of the lower portion of the sidewall portion 26 during a molding process may be designed to closely match a curvature of the inflated example tire 10 so as to build a desired pre-stress in the rubber of the main body portion 16 and turnup portion 18.

As shown in FIG. 1, the sidewall portion 26 of the example tire 10, in accordance with the present invention, may further include a first layer 51 and a second layer 52. A conventional sidewall portion consists of a single layer of a highly resistant sidewall compound, protecting the carcass against mechanical, chemical, and thermal hazards. A total sidewall gauge for a conventional passenger tire may be 2-4 mm. However, only a thin layer of 1-1.5 mm has been found, in accordance with the present invention, to be necessary for the sidewall portion to effectively fulfill a protective purpose. Thus, conventional sidewall gauge appears to be over-dimensioned in terms of thickness. Further, a thicker gauge is conventionally required to obtain a desired path for a carcass ply, such as the carcass ply 12, and to avoid manufacturing limitations. As a result, a large portion of an expensive conventional sidewall compound in conventional tires only serves as a filler.

As shown in FIG. 1, the less stressed inner second layer 52 may be a compound of lower quality, weight, and cost, without decreasing performance and functional characteristics of the sidewall portion 26. Further, a porous version of the first layer 51 may be particularly suitable. In view of their lower density, porous compounds also reduce overall weight of the example tire 10. The generation of a desirable porosity of an example porous compound is described below.

In terms of manufacturing, a dual layer sidewall 26 may be incorporated into a tire either as separate components 51, 52 or as multiplex extruded component (duplex or triplex if co-extruded with the chaffer). The dual layer sidewall portion 26 with the porous inner layer 52 may also achieve a higher level of noise dampening within the carcass and increase resistance to crack propagation.

In accordance with one example aspect of the present invention, the inner second layer 52 of the sidewall portion 26 may be a foamed structure comprising a co-vulcanized foamed rubber composition having a density ranging from 0.1 to 1 $g/cm^3$. The foamed structure may be co-vulcanized with the example tire 10 in order to be integral with the dynamic tire construction. The foamed structure of the green tire may be an unvulcanized layer containing a heat activatable blowing agent shaped, molded, and heated under pressure to simultaneously co-vulcanize with the tire 10. Pressure may be applied by a shaping bladder positioned within a green tire to press and shape it outwardly against a mold. The example foamed structure may thereby be formed by heat activating the blowing agent during the vulcanization process to simultaneously expand the adherent solid layer. Typical vulcanization temperatures may range from about 90° C. to about 200° C.

Thus, the example foamed structure may be formed substantially simultaneously with the co-vulcanization step in order to enhance the integral tire construction. The foamed structure itself may therefore be integral with the tire construction, instead of being a simple laminate that is glued or otherwise attached to a previously cured tire. Further, the integral foamed structure within the sidewall portion 26 of the example tire 10 may be a gauge for conforming to conventional sidewall thicknesses.

In one example, the foamed structure may have a density ranging from about 0.1 to about 1.0 $g/cm^3$. This density may be the foamed, fully loaded compound, including elastomers and additives, such as carbon black, silica, zinc oxide, curatives, and oils. In another example, the foamed structure may have a density ranging from about 0.2 to about 0.9 $g/cm^3$. In still another example, the foamed structure may have a density ranging from about 0.2 to about 0.8 $g/cm^3$.

In still another example, the foamed structure may have a porosity ranging from about 20 to about 80 percent by volume. In still another example, the foamed structure may have a porosity ranging from about 30 to about 70 percent by volume. Porosity is defined as a fraction of the total volume of the foamed structure not occupied by a rubber compound. In other words, porosity is the volume fraction of the foamed structure occupied by void space in the pores and cells formed by the foaming agent.

The foamed structure may be foamed with a blowing agent. The blowing agents used for the manufacture of a pneumatic tire may liberate gases upon heating. Representative examples of such agents, such as nitrogen or carbon dioxide, may liberate gases and cause formation of integral closed cells. Agents which liberate nitrogen may be preferred. Such blowing agents may be compounds which give off gases triggered by the vulcanization temperatures, representative of which may be: nitro, sulfonyl, and azo compounds such as dinitrosopentamethylene tetramine, N,N'-dimethyl-N,N'-dinitrosophthalamide, azodicarbonamide; sulfonyl hydrazides such as benzenesulfonyl hydrazide, toluenesulfonyl hydrazide, and p,p'-oxy-bis-(benzenenesulfonyl)hydrazide; and sulfonyl semicarbazides such as p-toluene sulfonyl semicarbazide and p,p'-oxy-bis-(benzenesulfonyl semicarbazide). Carbon dioxide may be given off by compounds such as ammonium bicarbonate and sodium bicarbonate.

In order to obtain a desired density and porosity in the foamed structure, the amount of blowing agent may vary. In one example, the amount of blowing agent used in the rubber composition of the foamed structure may range from about 5 to about 25 phr. In another example, the amount of blowing agent may range from about 10 to about 25 phr.

A vulcanized rubber tire and a co-vulcanized integral foamed structure may be of various cured or vulcanized rubbers, such as natural rubber, synthetic rubber, and/or their mixtures/blends. For example, these vulcanized rubbers may be rubbery styrene-butadiene copolymers, butadiene-acrylonitrile copolymers, cis-1,4-polyisoprene, polybutadiene, isoprene-butadiene copolymers, butyl rubber, halogenated butyl rubber such as chloro or bromo butyl rubber, ethylene-propylene copolymers, ethylene-propylene-diene terpolymers, and polyurethane elastomers. These various polymers may be cured or vulcanized by normal curing methods and recipes, such as with sulfur, or with peroxides, such as in the case of the ethylene-propylene copolymers, or with primary diamines, such as in the case of polyurethane elastomers. The sulfur cured or vulcanized natural rubbers and synthetic rubbery polymers may be preferred, such as styrene-butadiene rubber, cis-1,4-polyisoprene, polybutadiene, butyl rubber, chlorobutyl rubber, and bromobutyl rubber.

It may be readily understood by those having skill in the art that the rubber compositions used in the integral foamed structure may be compounded by methods generally known in the rubber compounding art, such as mixing the various sulfur-vulcanizable constituent rubbers with various commonly used additive materials such as, for example but not limited to, curing aids such as sulfur, activators, retarders and accelerators, processing additives such as oils, resins including tackifying resins, silicas, and plasticizers, fillers, pigments, fatty acid, zinc oxide, waxes, antioxidants and antiozonants, peptizing agents and reinforcing materials such as carbon black. Depending on the intended use of the sulfur vulcanizable and sulfur vulcanized material (rubbers), the additives mentioned above may be selected and used in conventional amounts. The rubber compound may contain various conventional rubber additives. Typical additions of carbon black may comprise about 20 to 200 parts by weight per 100 parts by weight of diene rubber (phr).

A number of commercially available carbon blacks may be used. Included in the list of carbon blacks are those known under the ASTM designations N299, S315, N326, N330, M332, N339, N343, N347, N351, N358, N375, N539, N550 and N582. Processing aids may include, for example but not limited to, aromatic, naphthenic, and/or paraffinic processing oils.

Typical amounts of tackifying resins, such as phenolic tackifiers, may range from 1 to 3 phr. Silica, if used, may be used in an amount of about 5 phr to about 80 phr with or without a silica coupling agent. Representative silicas may be, for example, hydrated amorphous silicas. Typical amounts of antioxidants may comprise about 1 phr to about 5 phr. Representative antioxidants may be, for example, diphenyl-p-phenylenediamine, polymerized 1,2-dihydro-2,2,4-trimethylquinoline and others, such as, for example, those disclosed in the *Vanderbilt Rubber Handbook* (1990), Pages 343 through 362.

Typical amounts of antiozonants comprise about 1 phr to about 5 phr. Representative antiozonants may be, for example, those disclosed in the *Vanderbilt Rubber Handbook* (1990), Pages 363 through 367. Typical amounts of fatty acids, if used, which may include stearic acid comprise about 0.5 phr to about 3 phr. Typical amounts of zinc oxide may comprise about 2 phr to about 10 phr. Typical amounts of waxes may comprise about 1 phr to about 5 phr. Often microcrystalline waxes may be used. Typical amounts of peptizers may comprise about 0.1 phr to about 1 phr. Typical peptizers may be, for example, pentachlorothiophenol and dibenzamidodiphenyl disulfide.

Vulcanization may be conducted in the presence of a sulfur vulcanizing agent. Examples of suitable sulfur vulcanizing agents include elemental sulfur (free sulfur) or sulfur donating vulcanizing agents, such as an amine disulfide, polymeric polysulfide, or sulfur olefin adducts. Preferably, the sulfur vulcanizing agent is elemental sulfur. As known to those skilled in the art, sulfur vulcanizing agents may be used in an amount ranging from about 0.5 phr to about 5 phr or, in some circumstances, up to about 8 phr.

Accelerators may be used to control the time and/or temperature required for vulcanization and to improve the properties of the vulcanizate. In one example, a single accelerator system may be used, i.e., primary accelerator. Conventionally, a primary accelerator may be used in amounts ranging from about 0.5 phr to about 2.5 phr. In another example, combinations of two or more accelerators which are generally used in the larger amount (0.5 phr to 2.0 phr), and a secondary accelerator which is generally used in smaller amounts (0.05 phr to 0.50 phr) in order to activate and improve the properties of the vulcanizate. Combinations of these accelerators may produce a synergistic effect of the final properties and may be better than those produced by use of either accelerator alone. In addition, delayed action accelerators may be used which are not affected by normal processing temperatures but produce satisfactory cures at ordinary vulcanization temperatures. Suitable types of accelerators may be amines, disulfides, guanidines, thioureas, thiazoles, thiurams, sulfenamides, dithiocarbamates, and xanthates. If a second accelerator is used, the secondary accelerator may be a guanidine, dithiocarbamate, or thiuram compound.

The tire may be built, shaped, molded, and cured by various methods, which will be readily apparent to those having skill in such art. As noted previously herein, the foamed structure is co-vulcanized with the tire in order to be integral with the dynamic tire construction. The second layer 52 of the sidewall portion 26 may be built as a solid unvulcanized layer containing the heat activatable blowing agent onto the inner portion of the green, unvulcanized sidewall over a building form and then shaped, molded, and heated under pressure to simultaneously co-vulcanize therewith. The pressure is generally supplied by a shaping bladder positioned within the tire to press and shape it outwardly against a mold. The foamed structure may be formed by heat activating the blowing agent during the vulcanization process to simultaneously expand the adherent solid layer 52. Typical vulcanization temperatures may range from about 90° C. to about 200° C.

Thus, the example foamed structure of the inner layer 52 may be formed substantially simultaneously with the co-vulcanization step in order to enhance the integral tire construction. To do this, an unshaped and unvulcanized tire may be built around a tire building drum by first building over the drum a suitable innerliner, a rubberized fabric carcass ply layer 12, the second, inner layer 52 of rubber composition comprising the blowing agent, and the first, outer layer 51 of the sidewall 26. Over these initial layers of rubber, the remainder of the tire is built including the bead portions, belt reinforcement structure 22 and tread 24. The example fabricated tire 10 may then be removed from the building form and shaped, molded, and vulcanized in the tire.

The second, inner layer 52 of the specially compounded rubber may expand as the blowing agent is heat activated during the vulcanization process to form the foamed structure. However, this expansion may be suppressed during the tire molding by the presence of the shaping bladder which presses against the interior of the tire owing to the significant pressure of the bladder. The pressure in the bladder may be maintained higher than the pressure of the blowing agent being released in the foamed structure. Once the pressure in the bladder is released, the foamed structure is free to expand to its final conformation, which may include open and/or closed cells.

An example foamed structure is further defined below, but is intended to be representative rather than restrictive of the scope of the invention. Unless otherwise indicated, all parts and percentages are by weight.

In this example, the effect of varying amounts of blowing agent on the physical characteristics of a rubber compound is illustrated. A series of rubber compounds were prepared following the recipes shown in Table 1, with amounts given in parts by weight per 100 parts by weight of elastomer (phr). The compounds were then cured at 170° C. for 10 minutes. Porosity has been calculated from the density of the resulting compounds measured using the ASTM D297(2), DIN53479 method. The results are shown in Table 2.

TABLE 1

|  | Sample No. | | | | |
| --- | --- | --- | --- | --- | --- |
|  | 1 | 2 | 3 | 4 | 5 |
| Elastomer[1] | 100 | 100 | 100 | 100 | 100 |
| Filler[2] | 26 | 26 | 26 | 26 | 26 |
| Oil[3] | 10 | 10 | 10 | 10 | 10 |
| Zinc Oxide | 1 | 1 | 1 | 1 | 1 |
| Stearic Acid | 2 | 2 | 2 | 2 | 2 |
| Processing Aid[4] | 5.3 | 5.3 | 5.3 | 5.3 | 5.3 |
| Processing Aid[5] | 2 | 2 | 2 | 2 | 2 |
| Sulfur | 0.5 | 0.5 | 0.5 | 0.5 | 0.5 |
| Accelerators[6] | 1.24 | 1.24 | 1.24 | 1.24 | 1.24 |
| Blowing Agent[7] | 0 | 10 | 15 | 20 | 25 |

[1]Bromobutyl 2222 from Exxon Chemical
[2]Corax N660 from Degussa
[3]Flexon 641 from Exxon Chemical
[4]Koresin resin from Strucktol
[5]SP1068 from Schenectady International
[6]MBTS Vulkacit DM/C from Bayer
[7]Celogen OT from Crompton Corpration

TABLE 2

|  | Sample No. | | | | |
| --- | --- | --- | --- | --- | --- |
|  | 1 | 2 | 3 | 4 | 5 |
| Blowing Agent | 0 | 10 | 15 | 20 | 25 |
| Porosity, vol % | 00 | 39 | 58 | 70 | 76 |

TABLE 2-continued

|  | Sample No. | | | | |
| --- | --- | --- | --- | --- | --- |
|  | 1 | 2 | 3 | 4 | 5 |
| Density, g/cm³ | 1.12 | 0.7 | 0.49 | 0.35 | 0.28 |

While the invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. Thus, the invention in its broader aspects is therefore not limited to the specific details, representative apparatus and method, and illustrative examples shown and described. Accordingly, departures may be made from such details without departing from the spirit or scope of applicants' general inventive concept.

What is claimed is:

1. A pneumatic radial ply tire comprising:
    a pair of beads each with an associated chafer;
    a single carcass ply folded about each bead so as to define a main body portion and a turnup portion associated with each bead;
    a tread disposed radially outward from the single carcass ply, the tread having shoulder portions disposed at axial outer edges of the tread; and
    a pair of sidewalls extending radially outward from each chafer to a location adjacent each shoulder portion, each sidewall being disposed axially outward of the single carcass ply, each sidewall comprising a first outer layer extending from the chafer to the shoulder portion and a second inner layer extending from the chafer to the shoulder portion, the second inner layer being disposed entirely between the single carcass ply and first outer layer,
    the second inner layer comprising a foamed structure of a rubber composition having a density ranging from 0.1 to 1.0 g/cm³.

2. The tire as set forth in claim 1 wherein the foamed structure has a porosity ranging from about 20 to about 80 percent by volume.

3. The tire as set forth in claim 1 wherein the foamed structure has a porosity ranging from about 30 to about 70 percent by volume.

4. The tire as set forth in claim 1 wherein the chafer is disposed around an outside of each bead for protecting the single carcass ply from a rim on which the tire is mounted.

\* \* \* \* \*